United States Patent [19]

Rawlings et al.

[11] 4,225,620

[45] Sep. 30, 1980

[54] METHOD FOR FEEDING RUMINANT ANIMALS

[75] Inventors: Robert M. Rawlings; Donald Procter, both of Boise, Id.

[73] Assignee: Blue Wing Corporation, Ada County, Id.

[21] Appl. No.: 828,152

[22] Filed: Aug. 26, 1977

Related U.S. Application Data

[63] Continuation-in-part of Ser. No. 665,006, Mar. 8, 1976, abandoned.

[51] Int. Cl.² ............................................. A23K 1/04
[52] U.S. Cl. ........................................ 426/2; 426/623; 426/630; 426/641; 426/647; 426/807
[58] Field of Search ............... 426/623, 630, 98, 656, 426/657, 647, 641, 471, 807, 2; 260/121

[56] References Cited

U.S. PATENT DOCUMENTS

| | | | |
|---|---|---|---|
| 688,604 | 12/1901 | Dietrich | 260/121 |
| 3,137,631 | 6/1964 | Soloway | 426/98 |
| 3,711,291 | 1/1973 | Leidy | 426/574 |
| 3,925,560 | 12/1975 | Scott et al. | 426/98 |

FOREIGN PATENT DOCUMENTS 106543 6/1974 Fed. Rep. of Germany .

OTHER PUBLICATIONS

Gordon, "Animal Blood as a Source of Protein in Food Products", Food Trade Review, Apr. 1971, pp. 29–30.

*Primary Examiner*—R. B. Penland
*Attorney, Agent, or Firm*—Richards, Harris & Medlock

[57] ABSTRACT

An improved method for feeding ruminant animals so as to promote meat, fat and milk production whereby the animals are fed an alkali treated proteinaceous feed supplement that resists biodegradation in the rumen but is readily assimilable within the post-rumen gut.

15 Claims, No Drawings

METHOD FOR FEEDING RUMINANT ANIMALS

This ia a Continuation-In-Part of U.S. patent application Ser. No. 665,006, filed Mar. 8, 1976 now abandoned.

BACKGROUND OF THE INVENTION

This invention relates to a method of feeding ruminant animals. One aspect of the invention relates to more efficient utilization of protein-containing feeds for ruminant animals. Another aspect of this invention relates to a method of feeding ruminant animals proteinaceous feeds and feed supplements that resist biodegradation in the rumen portion of the ruminant animal's stomach but can be digested in the abomasum and lower gut. A further aspect of this invention relates to a method of feeding ruminant animals whereby it is possible to achieve increased growth rates and milk production.

The rumen or first stomach of a ruminant animal is the site of microbial digestion of forage cellulose. Microbial protein synthesized in the rumen during this process then becomes a major source of protein reaching the post-rumen gut. Unfortunately, rumen microflora such as bacteria and protozoa rapidly degrade the protein and amino acids which are present in the diet fed to the ruminant animal and are soluble in the rumen liquid phase. W. Chalupa, in his article "Rumen Bypass and Protection of Proteins and Amino Acids", 58 JOURNAL OR DAIRY SCIENCE 1198 (1975), cites the conclusions of several researchers that as little as 40% or as much as 80% of the dietary protein might be degraded in the rumen and transferred into microprotein. A further portion of the nitrogen produced by deamination of dietary protein by rumen microbes is not utilized for the synthesis of microbial protein, but is lost as ammonia either in belched rumen gases or absorbed through the rumen wall and ultimately excreted.

Therefore, while the rumen endows the ruminant animal with the capacity to digest and utilize cellulose effectively, it is relatively inefficient in the digestion and utilization of dietary protein contained in feed supplements. This explains the commonly accepted commercial practice of regulating the protein content of ruminant animals' diets to carefully predetermined levels. Protein fed in excess of these commercially accepted amounts usually does not improve animal growth or milk production.

The science of rumen bypass of feed proteins has been the subject of numerous investigations and subsequent literary reports. In his article, "Lactational Responses to Postruminal Administration of Proteins and Amino Acids", 58 JOURNAL OF DAIRY SCIENCE, 1178 (1975), J. H. Clark concluded that, "Future research to delineate limiting nutrients for post-ruminant supplementation should prove fruitful and should make a major contribution to improved production by ruminant animals." Similarly, W. Chalupa, supra, stated: "A feasible approach to production of animal protein from ruminants would be . . . maximization of rumen by-pass of dietary proteins and supplementation with rumen nondegradable amino acids." The importance of rumen bypass is illustrated by results of research trials where a high quality protein such as casein has been infused directly into the post-ruminal digestive tract of lactating dairy cows. Commenting upon these trials, Clark noted in his article that post-ruminal supplementation of casein has increased milk production from 1 to 4 kg/cow/day and milk protein yield by 10% to 15%. He also observed that the greatest increase in milk yield came from the highest producing cows.

Various methods have been utilized to protect proteins from rumen degradation. The two most commonly researched methods involve the denaturation of protein either by heat treatment or by chemical treatment with formaldehyde. The heat denaturation method was addressed by the Chalupa articles, and by K. Ferguson in "Microbial Fermentation in the Rumen", IV INTERNATIONAL SYMPOSIUM ON RUMINANT PHYSIOLOGY 448 (1974). Chalupa and Ferguson believe that reduced microbial fermentation as a consequence of heat treatment is attributable to the Maillard reaction between sugar aldehyde groups and free amino groups, and condensation reactions between the E-amino group of lysine and other amino acid side chains. Chalupa reviews many examples where rumen protection has been increased by heat treatment leading to increased nitrogen retention, weight gain and feed efficiency. However, protection produced by heating is counterbalanced by decreases in digestibility and biological value.

The treatment of proteinaceous matter with an aldehyde is disclosed in U.S. Pat. No. 3,619,200 to Ferguson. The protection of protein by treatment with formaldehyde has led to variable results. Chalupa states that in experiments with sheep, treatment of casein with formaldehyde generally has resulted in increased nitrogen retention, and wool and muscle growth, while treatment of plant proteins has not yielded consistent results. Formaldehyde treatment of soymeal and casein has not led to increased milk production in dairy cows. Furthermore, treatment of protein with formaldehyde usually leads to decreased protein digestibility.

An effective method of feeding ruminant animals so as to achieve rumen bypass for a wide variety of feed proteins is needed. Bypassing protein digestion in the rumen will result in increased milk production similar to that obtained by infusing high quality protein directly into the post-ruminal digestive tract. Furthermore, a method of feeding so as to achieve rumen bypass will increase the growth rate of ruminant animals.

SUMMARY OF THE INVENTION

The present invention provides a novel method for feeding ruminant animals. This invention will promote heat, fat and milk production in ruminant animals without causing associated gastric upset.

According to one embodiment of the invention, a novel method of feeding ruminant animals is provided whereby a feed supplement comprising a nutritionally effective portion of the ruminants' diet contains a nutritionally effective amount of an alkali treated proteinaceous material that resists biodegradation in the rumen but is readily assimilable within the abomasum and lower gut. The alkali treated proteinaceous material of the present invention is prepared by solubilizing proteinaceous matter in an aqueous medium, adjusting the pH of the solubilized mixture to a level of from about 9 to about 13.5, and drying the product thus formed to a particulate composition.

According to another embodiment, the alkali treated proteinaceous material of the present invention is maintained for a period effective to thicken it prior to drying.

According to another embodiment, a method of increasing meat, fat and milk production in ruminant animals without causing associated gastric upset is provided. That embodiment of the invention comprises preparing a feed supplement containing alkali treated proteinaceous material, feeding ruminant animals a nutritionally effective amount of the supplement, and allowing the supplement to be ingested, whereby the protein contained therein will pass through the rumen substantially unchanged and be assimilated within the abomasum and lower gut.

DETAILED DESCRIPTION OF THE INVENTION

This invention permits more efficient utilization of protein-containing ruminant feed materials. Proteinaceous materials suitable for use include soymeal, sunflower meal, safflower meal, lupines, meat and bone meal, blood meal, blood, lymph, chyle, milk whey, egg albumin, other animal or vegetable tissues and fluids, and mixtures thereof. Proteinaceous ruminant feedstuffs generally have a protein content ranging from about 30% to about 95% on a dry matter basis. Consequently, they are often utilized to upgrade the protein content of cereal grain based ruminant rations. Cereal rations ordinarily contain only 8% to 10% protein whereas the requirement for beef cattle and lactating dairy cattle is in the range of 14% to 20% protein. To upgrade the protein content of the ruminant animals' diet, feedstuffs containing from about 30% to about 95% protein are commonly added to cereal rations in amounts ranging from about 5% to about 20% of the total feed. Where the amount of protein in the total feed exceeds about 20%, protein in excess of 20% will generally not be effective in increasing meat, fat and milk production.

Proteinaceous feedstuffs are usually produced as by-products from other industries and are utilized in ruminant rations on the basis of cost, protein content and amino acid composition. These protein by-products can occur in either liquid or solid form. The novel feeding method of this invention will permit more efficient utilization of such protein.

According to the present invention, ruminant animals are fed a special feed supplement in addition to forage cellulose ordinarily ingested during grazing. The special feed supplement comprises a nutritionally effective amount of a proteinaceous material that resists biodegradation in the ruman but is readily assimilable within the abomasum and lower gut. For purposes of this invention, a nutritionally effective amount of the proteinaceous material is a quantity that will increase the protein content of the total feed above the 8% to 10% level ordinarily found in cereal grain based ruminant rations, thereby increasing meat, fat and milk production. In some cases, the protein content of a nutritionally effective amount can exceed 20% by weight of total feed. Dietary proteins from either animal or vegetable sources can be used in accordance with the present invention.

According to one embodiment of the invention, the proteinaceous matter used in the feed supplement is whole animal blood collected during killing operations in meat packing plants, slaughterhouses, and the like. The solids content of blood collected in this manner can vary, depending upon the extent to which it is diluted by wash water used to clean the kill floor. A solids content of from about 12% to about 21% can be employed for the aqueous blood mixture of the present invention. The solids content is believed to comprise about 50% albumin and about 50% other blood proteins. Thus, as used here, blood contains from about 6 to about 10.5 weight percent albumin and from about 6 to about 10.5 weight percent other blood proteins. In other preferred embodiments, commercially available preparations of soymeal, meat and bone meal, and blood meal are utilized as the proteinaceous material.

According to the method of the invention, the proteinaceous material is prepared for inclusion in the feed supplement by solubilizing it within an aqueous medium, adjusting the pH of the solubilized mixture to a level of from about 9 to about 13.5, and drying to a particulate composition. Where the proteinaceous material is obtained in a dry form, water must be added with mixing in order to solubilize the protein. Sufficient water is required to adequately penetrate the feed protein particles. A 1:1 ratio of water to proteinaceous material is ordinarily sufficient to effect such penetration. Furthermore, heating the aqueous solution to a temperature ranging from about 30 degrees C to about 80 degrees C will assist in solubilizing proteinaceous matter obtained in a dry form. Where a proteinaceous material such as animal blood is obtained in an aqueous form, the admixing of additional water and heating are not required.

Any suitable alkaline agent can be employed to adjust the pH of the aqueous medium containing the protein to a level ranging from about 9 to about 13.5. Suitable alkaline agents include nontoxic alkali metal hydroxides and alkaline earth metal hydroxides. In a preferred embodiment of the invention, especially desirable results have been obtained where the alkaline agent is sodium hydroxide. Because the pH will often tend to decline after the pH of the aqueous solution has been adjusted initially, it may be necessary to employ additional quantities of the alkaline agent to maintain the aqueous solution within the prescribed pH range. The solubilized proteinaceous mixture should be stirred during the addition of the alkaline agent to ensure it is evenly distributed throughout the proteinaceous material. The pH-adjusted mixture can also be heated to a temperature ranging from about 55 to about 85 degrees C to promote gelling of the mixture prior to drying.

According to one embodiment of the invention, the pH-adjusting proteinaceous material is maintained for a sufficient period to effect thickening of the solution. A period that has proven both effective and convenient is 12 hours. Maintaining the pH-adjusted proteinaceous material for a sufficient time to allow thickening will facilitate the drying operation.

When full aqueous penetration of the protein feed particles has been achieved and the pH has been adjusted to a level within the prescribed range, the product can be dried in any conventional dehydrator or dryer to a moisture content of less than about 20 weight percent of the proteinaceous solution. A preferred drying apparatus is a rotary drum-type agricultural dryer.

The following examples are set forth in order to more fully describe the present invention.

EXAMPLE I

Initially, 800 gallons of an aqueous blood containing solution obtained from a slaughterhouse was pretreated with an effective amount of sodium hydroxide to yield an aqueous solution having a pH of about 10.0. The aqueous solution contained about 16 weight percent blood solids of which about 50%, e.g., about 8 weight percent, was albumin. A 4 liter aliquot of the base treated aqueous solution was further treated with sodium hydroxide to yield a resultant aqueous solution having a pH of about 10.5. The resultant aqueous solution was allowed to stand at room temperature for about 18 hours. Thereafter, the pH of the solution was again measured and it was noted that the pH of the solution had dropped to about 10.0. The aqueous solution was further divided into four 1 liter aliquots. The aliquots were then diluted with an effective amount of deionized water to provide aqueous solutions having the following blood solids contents.

Aliquot I—16% blood solids (about 8% albumin) no dilution
Aliquot II—14% blood solids (about 7% albumin)
Aliquot III—12% blood solids (about 6% albumin)
Aliquot IV—10% blood solids (about 5% albumin)

Each of the above four solutions was then employed to provide nine 100 ml samples.

An effective amount of sodium hydroxide was then incorporated into each sample so that samples having the following pH values were obtained:

| (1) 10.0 | (4) 11.0 | (7) 12.0 |
|---|---|---|
| (2) 10.3 | (5) 11.3 | (8) 12.5 |
| (3) 10.7 | (6) 11.7 | (9) 13.0 |

Each of the samples was then heated to a temperature sufficient to allow gel formation, e.g., from about 70 to about 85 degrees C. Each sample was stirred continuously during the heating of same. The results of the above experiment are tabulated as follows:

Aliquot I—samples containing 16% blood solids (about 8% albumin): Within a pH range of from about 10.7 to about 12.5 a satisfactory gel was obtained.

Aliquot II—samples containing 14% blood solids (about 7% albumin): Within a pH range of from about 10.7 to about 12.5 a satisfactory gel was obtained.

Aliquot III—samples containing 12% blood solids (about 6% albumin): Within a pH range of from about 10.7 to about 12.0 a satisfactory gel was obtained.

Aliquot IV—samples containing 10% blood solids (about 5% albumin): No satisfactory gels were obtained at any pH within the range tested.

The term "satisfactory gel" as used hereinabove is to be understood to mean a gel of firm consistency which can readily be dried to a particulate composition within an agricultural-type dehydrator.

EXAMPLE II

An experiment was conducted to determine the effectiveness of delactosed dry whey powder as the source of albumin to produce the compositions of the present invention. Initially 40 grams of delactosed whey powder* was admixed with 59 ml of water to form an aqueous albumin containing solution. One gram of sodium hydroxide pellets was then dissolved in the aqueous solution to form a solution having a pH of about 11.0. The pH adjusted aqueous solution was then passed through a laboratory stone mill and the mill was adjusted to a fine gap. The mixture was passed through the mill until a smooth, homogeneous product was obtained. The pH of the homogeneous product was determined to be 10.7. The homogeneous product was then heated in a water bath. At about 70 degrees C the product started to gel. Heating was continued until a firm gel resulted at a temperature of 85 degrees C.

* The delactosed whey contained about 24% by weight albumin. Thus, the aqueous solution contained about 9% by weight albumin.

EXAMPLE III

Initially 100 lb. batches of soymeal (minimum 49% protein solvent extract) were processed in the following manner: To a 40 gallon capacity ribbon band mixer was added 10 gallons of water at a temperature of 40 degrees C. To the water was added 2.2 lbs. of sodium hydroxide in prill form. The mixer was activated until the sodium hydroxide had dissolved and then 100 lbs. of the soymeal was immediately added. The soymeal was mixed in the caustic solution for 5 minutes to ensure thorough mixing, after which it was emptied onto a concrete floor. After the addition of the meal to the caustic solution a visible thickening of the wet meal became evident and a strong smell of ammonia arose. Several 100 lb. batches were processed in an identical manner. After 20 batches, the combined material was dried in a Berk ring dryer with an inlet temperature of 600 degrees F and an outlet temperature of 180 degrees F. The final product resembled a fine dry meal. To act as a control for the process, an equal amount of product was produced in an identical manner but without the addition of sodium hydroxide. In the case of these control batches no visible thickening of the material took place and no ammonia smell could be detected.

The formulation of the treated material was:

|  | % | % of Dry Material | % of Protein |
|---|---|---|---|
| Soymeal | 100 lbs. | 49.5% | 97.8% | — |
| Sodium Hydroxide | 2.2 lbs. | 1.1% | 2.2% | 4.5% |
| Water | 100 lbs. | 49.5% | — | — |
| Total | 202.2 lbs. | 100.1% | | |

The pH of the alkali treated wet material was 11.8. The treated wet material was 50.5% dry matter and dried very efficiently. Analysis of the dried treatment and control soymeals revealed:

|  | Alkali Treated | Control |
|---|---|---|
| Moisture | 8.0% | 8.0% |
| Protein (D.M.B.) | 44.6% | 46.3% |
| pH* | 9.8 | 6.2 |

*1:4 w/v dispersion is distilled water at 10 degrees C.

EXAMPLE IV

Initially 10 gallons of 12% solids aqueous blood obtained from a slaughterhouse was pumped into a ribbon band mixer. To the blood was added 1 lb. of sodium hydroxide dissolved in 0.25 gallons of cold water. The alkali blood mixture was mixed for 5 minutes after which the pH rose to 11.0 and the material darkened in color, thickened in consistency and gave off a strong ammonia smell. To the alkali was added 40 lbs. of wheat bran and mixing continued for an additional 5 minutes. The mixture stood on a concrete floor for 2 hours and was then dried in a Berk ring dryer. Several identical batches were processed.

The formulation of the treated material was:

|  |  |  | % of Dry Matter | % of Blood Protein |
|---|---|---|---|---|
| (10 gallons of 12% solids aqueous blood) | | | | |
|  | 12 lbs. blood solids | | 22.6% | |
|  | 88 lbs. water | | | |
| Sodium hydroxide | 1 lb. | | 1.9% | 8.4% |
| Wheat bran | 40 lbs. | | 75.6% | |
| Total | 141 lbs. | | | |
| Total Solids | 53 lbs. | | | |
| Total Solids % | 38% | | | |

The addition of bran raised total solids to 28%, which allowed convenient drying. Analysis of the dried material gave:

| Moisture | 10.5% |
|---|---|
| Protein | 32.1% |
| pH* | 10.2 |

*1:4 w/v dispersion in distilled water at 10 degrees C.

EXAMPLE V

Initially 110 lbs. of commercial meat and bone meal containing a minimum of 50% protein was treated in the following manner. 14 gallons of water at 65 degrees C. was added to a ribbon band mixer. To the water was added 2.2 lbs. of sodium hydroxide which was mixed for 5 minutes. The meat and bone meal was then added to the alkali solution and mixing continued for an additional 5 minutes. During this mixing period the material thickened and gave off ammonia gas. At the end of the mixing period the treated meal was emptied onto a concrete floor and left overnight. It was dried the following morning in the Berk ring dryer. Several identical batches were produced.

The formulation of the treated material was:

|  |  |  | % of Dry Matter | % of Protein |
|---|---|---|---|---|
| Meat and Bone Meal | 110.0 | lbs. | | |
| Sodium hydroxide | 2.2 | lbs. | 2.0% | 4.0% |
| Water | 140.0 | lbs. | | |
| Total | 252.2 | lbs. | | |
| Total Solids | 112.2 | lbs. | | |
| Total Solids % | 44.5% | | | |

The treated wet material had a pH of 12.0. The treated wet material was 44.5% dry matter and dried very efficiently. Analysis of the dried treated meal was:

| Moisture | 11.7% |
|---|---|
| Protein | 52.0% |
| pH* | 10.4 |

*1:4 w/v dispersion in distilled water at 10 degrees C.

EXAMPLE VI

A ribbon band mixer was filled with 16 gallons of water at a temperature of 40 degrees C. 3.3 lbs. of sodium hydroxide was added to the water and dissolved by mixing for 5 minutes. To the alkali water was added 155 lbs. of whole soybean meal containing 36% protein which had been prepared by passing whole soybean through a "Modern" mix mill with a 3/16" screen. The ground soybean was mixed in the alkali water for 5 minutes during which time it thickened and gave off a strong ammonia smell. 18 hours later the mixture was transferred to a Berk ring dryer and dried. Several identical batches were prepared. Additional batches were prepared without the addition of sodium hydroxide. These batches provided control material for the process. They did not thicken or give off ammonia. The formulation of the treated soybean was:

|  |  |  | % of Dry Matter | % of Protein |
|---|---|---|---|---|
| Ground Whole Soybean | 155.0 | lbs. | | |
| Sodium hydroxide | 3.3 | lbs. | 2.1% | 5.9% |
| Water | 160.0 | lbs. | | |
| Total | 318.3 | lbs. | | |
| Total Solids | 158.3 | lbs. | | |
| Total Solids % | 49.7% | | | |

Analysis of the dried meal was:

|  | Treatment | Control |
|---|---|---|
| Moisture | 11.8% | 10.9% |
| Protein | 38.1% | 39.7% |
| pH* | 10.2 | 6.5 |

*1:4 w/v dispersion in distilled water at 10 degrees C.

EXAMPLE VII

A ribbon band mixer was filled with 16 gallons of water at 65 degrees C. To the water was added 110 lbs. of commercial blood meal containing 90% protein which was mixed in the water for 5 minutes. 4.4 lbs. of sodium hydroxide dissolved in 1 gallon of water was then cooled to the wetted blood meal and mixing continued for 5 minutes. On addition of the alkali, the blood meal mixture thickened and gave off ammonia gas. The alkali treated blood meal was dried immediately in the Berk ring dryer. Several identical batches were prepared. The formulation of the treated blood meal was:

|  |  |  | % of Dry Matter | % of Protein |
|---|---|---|---|---|
| Blood Meal | 110.0 | lbs. | | — |
| Sodium Hydroxide | 4.4 | lbs. | 4.0% | 4.4% |
| Water | 170.0 | lbs. | — | — |
| Total | 284.4 | lbs. | | |
| Solids | 114.4 | lbs. | | |
| Total Solids % | 40.2% | | | |

The treated wet material was 40.2% dry matter and dried easily. Analysis of the dried treated material was:

| Moisture | 5.0% |
|---|---|
| Protein | 87% |
| pH* | 10.0 |

*1:4 w/v dispersion in distilled water at 10 degrees C.

EXAMPLE VIII

A ribbon band mixer was filled with 12 gallons of water at 65 degrees C. to which was added 2.2 lbs. of sodium hydroxide and mixing allowed for 5 minutes. To the alkali water was then added 100 lbs. of soymeal (49% protein solvent extract) which had previously been passed through a "Modern" mix mill with a 3/16"

screen. Mixing continued for a further 5 minutes during which time the material thickened and released ammonia gas. The alkali treated ground soymeal was then dried immediately. Several identical batches were processed.

The formulation of the treated ground soymeal was:

|  |  | % of Dry Matter | % of Protein |
|---|---|---|---|
| Ground Soymeal | 100.0 lbs. |  |  |
| Sodium Hydroxide | 2.2 lbs. | 2.2% | 4.4% |
| Water | 120.0 lbs. |  |  |
| Total | 222.2 lbs. |  |  |
| Total Solids | 102.2 lbs. |  |  |
| Total Solid % | 46.0% |  |  |

The treated material was 46% dry matter and dried without difficulty. Analysis of the dried material was:

| Moisture | 12% |
|---|---|
| Protein | 47% |
| pH* | 9.9 |

*1:4 w/v dispersion in distilled water at 10 degrees C.

EXAMPLE IX

Alkali treated blood solids prepared by the process described in Example IV were pelleted into ¼" pellets with the inclusion of 5% cane molasses. Thus the pellets contained approximately 20% treated blood solids, 75% wheat bran and 5% molasses. Four dairy cows in a commercial herd were split into two groups of two cows each and each group was fed with 10 lbs./head/day of the above treatment pellets or 10 lbs./head/day of commercial dairy concentrate pellets containing 18.0% protein. The two groups were fed their treatment or control rations for 14 days after which the rations were changed over between the two groups and feeding continued for a further 14 days.

The pellets were fed once/day after morning milking. For the purpose of analysis, data was used from the second week of each feeding period as is customary with cross-over designs.

| Average Milk Yield (lbs./head/day) | | | | |
|---|---|---|---|---|
|  | Week II | | Week IV | |
| Group I | 54.1 | (control) | 57.4 | (treatment) |
| Group II | 52.0 | (treatment) | 44.4 | (control) |
| Difference | 2.1 | | 13.0 | |

The treatment effect is estimated as $(13.0 - 2.1)/2 = +5.45$ lbs. or $+11\%$ increase. The difference is significant at the 1% level by the F-test in the analysis of variance after removing group and period effects.

It is evident that the feeding of approximately 2 lbs./head/day of alkali treated blood solids prepared by the process of Example IV increased milk yield by 5.45 lbs. or 11% as compared with 10 lbs. of a conventional dairy concentrate.

EXAMPLE X

Eighteen dairy cows in a dairy herd at an agricultural college were fed 10 lbs./head/day of a commercial dairy concentrate pellet containing 18% protein. This pre-experimental period lasted for 14 days. At the end of the pre-experimental period the cows were split into two groups of nine cows each, paired on the basis of calving date. One group (control) continued to receive the dairy pellets for a further 14 days while the other group (treatment) was fed 10 lbs./head/day of the alkali treated blood pellets described in Example IX and produced by the process of Example IV.

Milk yield and milk composition were recorded daily during the last 7 days of the pre-experimental period and the last 7 days of the experimental period. Butterfat percentage was measured by the "Milkotester", protein percentage by the "Pro-Milk" and non-fat solids percentage by the specified gravity method. Data in the experimental period was analyzed by the analysis of covariance using the data in the pre-experimental period as covariates. Analysis of the adjusted means gave:

| | Adjusted Means (lbs./head/day) | | | | |
|---|---|---|---|---|---|
| | Control | Treatment | Difference | Significance | % Increase |
| Milk Yield | 49.47 | 55.82 | + 6.35 | ** | 12.8 |
| Fat % | 3.24 | 3.34 | + .10 | N.S. | 3.1 |
| Protein % | 3.49 | 3.61 | + .12 | * | 3.4 |
| S.N.F. % | 8.83 | 8.86 | + .04 | N.S. | .5 |
| Fat Yield | 1.607 | 1.843 | + .236 | ** | 14.7 |
| Protein Yield | 1.733 | 2.002 | + .269 | ** | 15.5 |
| S.N.F. Yield | 4.356 | 4.938 | + .582 | ** | 13.4 |

**Significant at 1% level
*Significant at 5% level
N.S. Not Significant

It is evident that the feeding of approximately 2 lbs./head/day of alkali treated blood solids from the process of Example IV, as compared with 10 lbs. of conventional dairy concentrate, increased milk production by 6.35 lbs./head/day or 12.8%. Milk composition was not significantly changed with the exception of a small increase in protein percentage. The yield of all milk components increased significantly, especially protein yield. These results are similar to those reviewed earlier in reference to the direct infusion of casein into the post-rumen digestive tract.

EXAMPLE XI

Six dairy cows in a commercial herd were divided into two groups of three cows each by pairing on calving date, and fed either 5 lbs./head/day of alkali treated 49% protein solvent extract soymeal produced by the process of Example III and pelletized into ¼" pellets with the inclusion of 5% molasses, or 5 lbs./head/day of 49% protein solvent extract soymeal produced by the process of Example III without the addition of alkali, and also pelletized into ¼" pellets with the inclusion of 5% molasses. The cows were fed the treated or untreated soymeal pellets once a day after morning milking and then allowed to return to pasture. Individual milk yields were recorded at each milking. The cows were fed in a double cross-over design with three periods of two weeks each. The design was:

|  | Weeks 1 & 2 | Weeks 3 & 4 | Weeks 5 & 6 |
|---|---|---|---|
| Group I | Untreated | Treated | Untreated |
| Group II | Treated | Untreated | Treated |

Two cows in Group I refused to eat the untreated ration at the first cross-over and had to be removed from the trial. This left an unbalanced design for analysis with one cow in Group I and three cows in Group II. Data used for analysis was taken from the second week in each period as is customary for a cross-over design. The data was analyzed by the least squares method of fitting constants for cows, periods and treatments, and the treatment difference tested for significance by the F-test after eliminating cow and period effects in the usual manner for nonorthogonal data. Least squares constants were:

| | | |
|---|---|---|
| Cow 1 | 59.85 | lbs./head/day |
| Cow 2 | 40.84 | lbs. |
| Cow 3 | 35.60 | lbs. |
| Cow 4 | 57.41 | lbs. |
| Period 1 | — 1.41 | lbs. |
| Period 2 | .0 | lbs. |
| Period 3 | — 4.45 | lbs. |
| Untreated | .0 | lbs. |
| Treated | 6.05 | lbs. **(Se = .72 lb.) |

**Significant at the 1% level

The treated soymeal increased milk yield by +6.05 lbs. or +12.5% over the cow average of 48.45 lbs. as compared with the untreated soymeal.

EXAMPLE XII

Alkali treated ground whole soybean produced by the process of Example VI and containing 36% protein and 18% oil was pelleted into ¼" pellets with the inclusion of 5% molasses. Ground whole soybean produced by the process of Example VII but without the addition of alkali was also pelleted into ¼" pellets with the inclusion of 5% molasses.

Eighteen dairy cows in a dairy herd at an agricultural college were divided into three groups of six cows each on the basis of matching calving dates. All 18 cows were fed 4.4 lbs./head/day of commercial dairy concentrate pellets containing 18% protein for a pre-experimental period of 14 days. At the end of the pre-experimental period one group continued on 4.4 lbs. of dairy pellets, the second group received 4.4 lbs. of untreated soybean pellets and the third group received 4.4 lbs. of treated soybean pellets. The experimental period continued for a further 14 days. Milk yield and milk composition were individually recorded at each milking during the last seven days of the pre-experimental period and the last seven days of the experimental period. Butterfat percentage was measured by the "Milkotester", protein percentage by the "Pro-Milk" and SNF percentage by the specific gravity method.

Data in the treatment period was analyzed by the analysis of covariance using data in the pre-experimental period as covariates. Mean differences between the three groups were tested for significance by the t-test based on the standard error of the difference between pairs of adjusted means. The following significant mean differences between adjusted means were obtained.

| | Treated-Control | Untreated-Control | Treated-Untreated |
|---|---|---|---|
| Milk Yield (lbs./day) | +3.75** | +3.09* | +.66 NS |
| Total Solids (lbs./day) | +.507** | +.337 NS | +.170 NS |
| Fat Yield (lbs/day) | +.225** | +.101 NS | +.121* |
| SNF Yield (lbs/day) | +.291* | +.238 NS | +.953 NS |

**Significant at the 1% level.
*Significant at the 5% level.
NS Non-significant

The treated soybean significantly increased milk yield, fat yield, SNF yield and total solids yield over those obtained with dairy concentrate pellets. The untreated soybean significantly increased milk yield over the dairy pellets but not fat yield, SNF yield or total yield. Although the treated group outyielded the untreated group for milk yield, total solids yield, fat yield and SNF yield, only fat yield was significantly different. The transfer rate of oil into butterfat was 31% for the treated soybean as compared with only 14% for the untreated soybean.

EXAMPLE XIII

Alkali treated solvent extract soymeal containing 49% protein produced by the process of Example VIII was pelleted with the inclusion of 5% molasses. An untreated ration consisting of commercial solvent extract 49% protein soymeal also pelleted with the inclusion of 5% molasses.

Eighteen cows in a dairy herd at an agricalatural college were divided into six groups of three cows each and fed for 28 days according to the following design:

| | Period 1 (2 wks.) | Period II (2 wks.) |
|---|---|---|
| Group 1 | P | T |
| Group 2 | P | P |
| Group 3 | U | T |
| Group 4 | U | P |
| Group 5 | T | P |
| Group 6 | T | P | where
P = 4.4 lbs./head/day of 18% Protein Commercial Dairy Pellets
U = 4.4 lbs./head/day of Untreated Soymeal Pellets
T = 4.4 lbs./head/day of Treated Soymeal Pellets Individual milk yields fat percentage (Milkotester) and SNF percentage (specific gravity method) were recorded daily during the second week of each period. Individual data from a previous pre-experimental period were used as covariates.

Data was analyzed by the least squares method of fitting constants for groups, periods, treatments and linear regression on the pre-experimental period. There were no significant differences for any milk component composition but milk fat and SNF yields were increased for treated soymeal.

| | T - P | U - P | T - U |
|---|---|---|---|
| Milk Yield (lbs.) | 2.14** | 1.28 NS | .86 NS |
| Fat Yield (lbs.) | .05* | −.04 NS | .09* |
| NSF Yield (lbs.) | .19** | .16 NS | .02 NS |

**Significant at 5% level.
*Significant at 10% level.
NS Not Significant

Although the increased milk yield due to the treatment material is lower than in other trials, it must be noted that these cows were in the stage of falling production with summer pasture rapidly drying up.

EXAMPLE XIV

To demonstrate the equivalence of alkali treatment of protein feedstuffs as a means of protection as compared with heat denaturation, the following trial was carried out. Twenty-eight dairy cows in a herd at an agricultural college were milk recorded during a seven day pre-experimental period. On the basis of individual milk production during this period, the cows were divided into four groups of seven cows each such that group means were similar. The four groups were then fed the following rations for a two-week period.

GROUP I 11 lbs./head/day, 18% protein commercial dairy pellets

GROUP II lbs./head/day, untreated blood meal ration

GROUP III 11 lbs./head/day, alkali-treated blood meal ration

GROUP IV 11 lbs./head/day, alkali-treated blood solids rations

The untreated blood meal ration consisted of 22% commercial blood meal and 78% wheat bran, pelleted with 5% molasses.

The treated blood meal ration consisted of 22% commercial blood meal treated by the process of Example VII and 78% wheat bran, pelleted with 5% molasses.

The treated blood solids ration consisted of 22% blood solids treated by the process of Example III and 78% wheat bran, pelleted with 5% molasses.

Thus, all three blood protein rations were close to 100% protected as measured by the in-vitro method of Example XV, two were alkali-treated according to the process of the present invention and one was alkali-treated in a completely undenatured state.

During the treatment period, the cows were fed 6.6 lbs./head at morning milking and 4.4 lbs./head at evening milking. Grazing was on low quality dry summer pasture.

Milk yield and samples were taken during the second week of the experimental period. Samples were analyzed for fat percentage (Milkotester), protein percentage (Pro-Milk), and acid SNF percentage (specific gravity method).

The data was analyzed by the method of analysis of covariance using pre-experimental data as covariates. Adjusted means were as follows:

| | Adjusted Means Milk Yield (lbs./head/day) | | |
|---|---|---|---|
| | Unadjusted | Adjusted | Difference from Control |
| Dairy Pellets | 41.9 | 43.4 | — |
| Untreated Blood Meal | 46.3 | 46.1 | +2.7* |
| Treated Blood Meal | 46.5 | 45.2 | +1.6 NS |
| Treated Blood Solids | 47.6 | 46.3 | +2.9* |

*Significant at 5% level.
NS Non-significant

There were no significant differences between dairy pellets and blood means for unadjusted and adjusted means for fat percentage, protein percentage and SNF percentage.

EXAMPLE XV

To demonstrate the characteristics of proteins treated by the process to show reduced biodegradation in the rumen, the following procedure was adopted. Approximately 2.0–2.5 g of either treated or untreated protein feedstuff which had been passed through a 850 micron mesh and held on a 250 micron mesh, were incubated anaerobically in fresh strained rumen fluid for a period of 20 hours at 39 degrees C. At the end of the incubation a duplicate 1 ml sample of the liquor was removed from each incubation and used in the determination of ammonia according to the method of Conway 1950. That is, the ammonia released into the rumen fluid from microbial deamination of protein was absorbed into boric acid solution and titrated directly with hydrochloric acid. To allow for ammonia production from the rumen liquor during incubation, a blank incubation was run with rumen liquor only. As an example of a readily soluble form of protein, acid casein was also incubated.

Incubations were carried out with the following materials:

(i)—Acid casein (ii)—Untreated soybean produced by the process of Example VI without the addition of alkali.

(iii)—Treated soybean produced by the process of Example VI.

(iv)—Untreated soymeal produced by the process of Example III without the addition of alkali.

(v)—Treated soymeal produced by the process of Example III.

(vi)—Commercial solvent extract soymeal.

(vii)—Treated soymeal produced by the process of Example VIII.

(viii)—Commercial meat and bone meal.

(ix)—Treated meat and bone meal produced by the process of Example VIII.

(x)—Commercial blood meal.

(xi)—Treated blood meal produced by the process of Example VII.

(xii)—Ground whole lupines.

All results are expressed as milligrams of recovered ammonia nitrogen (above the rumen liquor blank) per milligram of sample nitrogen added. The nitrogen content of the sample was taken as 0.16 of dry matter protein. The results are shown in Table I.

TABLE I

Milligrams Recovered Ammonia Nitrogen (Above Blank)/Milligrams Nitrogen in Sample

| Sample | I | II | III | IV | V | VI | VII | Average |
|---|---|---|---|---|---|---|---|---|
| (i) | .186 | .156 | .243 | .323 | .278 | .261 | .290 | .248 |
| (ii) | .169 | .043 | .128 | | | | | .113 |
| (iii) | .056 | −.010 | .058 | | | | | .035 |
| (iv) | | .114 | | | .148 | | | .131 |
| (v) | | −.046 | | | .029 | | | −.008 |
| (vi) | | | .125 | .297 | .192 | | | .205 |
| (vii) | | | .029 | .063 | | | | .032 |
| (viii) | | | .133 | | | .091 | | .112 |
| (ix) | | | .080 | | | .058 | | .069 |
| (x) | | | .030 | | .005 | | .015 | .017 |
| (xi) | | | | | .006 | | .016 | .011 |
| (xii) | | | | | | | .103 | .103 |

Note:
(a) All ammonia nitrogen determinations in duplicate
(b) Incubation No. IV is mean of four replicates.
(c) Incubation No. V is mean of two replicates.
(d) Incubation No. VI is mean of two replicates.
(e) Incubation No. VII is mean of three replicates.

The figures in Table I clearly show the substantial reduction in deamination of the treated materials compared with untreated materials. The results for (ii) versus (iii) and (iv) versus (v) also show that the reduced deamination is not due to the drying operation as both of these control materials were water treated (without alkali) and dried identically to the treated samples. The figures for untreated materials also demonstrate the well known effect of heat processing on the resistance to rumen deamination of various processed feedstuffs. Thus, steam coagulated/dried commercial blood meal which is only 1–3% soluble is almost completely naturally protected, and only a negligible improvement due to alkali treatment is possible. Commercial meat and bone meal which has been dried by cooking shows a deamination level half that of casein as does dried soybean and redried soymeal, while solvent extract soymeal (not redried) and lupines (unprocessed) show a deamination level approaching that of casein.

Clearly, the effect of the invention is greatest with those protein feedstuffs which have the lowest level of natural protection, although improvement is achieved in all examples.

In Table II, the results in Table I are presented on the basis of percentage protection relative to casein. This is obtained by taking the deamination figure for each sample as a percentage of that for casein and expressing as a difference from 100%.

TABLE II

| Sample | Relative Protection (%) Incubation | | | | | | | |
|---|---|---|---|---|---|---|---|---|
| | I | II | III | IV | V | VI | VII | Average |
| (ii) | 9 | 72 | 47 | | | | | 43 |
| (iii) | 70 | 106 | 76 | | | | | 84 |
| (iv) | | 27 | | | 47 | | | 37 |
| (v) | | 129 | | | 90 | | | 109 |
| (vi) | | | 49 | 9 | 31 | | | 29 |
| (vii) | | | 88 | 80 | | | | 84 |
| (viii) | | | 45 | | | 65 | | 55 |
| (ix) | | | 67 | | | 77 | | 72 |
| (x) | | | 88 | | 98 | | 95 | 94 |
| (xi) | | | 95 | | 98 | | 94 | 96 |
| (xii) | | | | | | | 17 | 17 |

Thus the casein figure in each incubation is taken as 0% protected, and all other samples are expressed relative to this base. Table II shows that (relative to casein) treated materials are substantially protected from deamination, the lowest being lupines at 64%, while untreated materials are substantially less than 50% protected, the exception being blood meal which is known to be almost completely insoluble. Following incubation, rumen liquor pH was checked in several samples to ensure that the pH of the treated material had not interfered with rumen fluid metabolism. Typical examples are:

| | Treated | Untreated |
|---|---|---|
| Soymeal | 6.55 | 6.62 |
| | 6.60 | 6.60 |
| | 6.55 | 6.55 |
| | 6.66 | 6.58 |
| | 6.90 | 7.05 |
| Lupines | 5.5 | 5.9 |
| | 5.8 | 6.0 |
| | 5.7 | 5.4 |
| Blood Meal | 6.3 | 6.4 |
| | 6.2 | 6.8 |

There is clearly no effect of sample pH on that of the incubated rumen liquor.

This invention therefore provides a novel method of feeding ruminant animals so as to promote meat, fat and milk production through more effective utilization of protein-containing feedstuffs. Proteinaceous materials suitable for use in the subject invention are characterized by their surprising ability to substantially resist biodegradation in the rumen while being readily assimilable in the abomasum and lower gut.

As will be apparent to those of ordinary skill in the art upon reading the present disclosure, many alterations, substitutions and equivalents may be applicable to the various disclosed embodiments of the invention. It is the intent, however, that the concepts disclosed herein be limited only by the appended claims.

We claim:

1. A process of feeding ruminant animals a nutritionally effective amount of a feed supplement consisting essentially of:
   feeding said ruminant animals a composite feed supplement containing protein material treated by a process consisting of alkali solubilizing said protein material in an aqueous medium having a pH from about 9 to about 13.5 and drying said aqueous material to a particulate gel composition said treated protein material resisting biodegradation in the rumen but readily assimilable within the post rumen gut whereby meat, fat and milk production are promoted without gastric upset.

2. The method of claim 1 wherein the proteinaceous material is selected from animal and plant proteins.

3. The method of claim 2 wherein the proteinaceous material is selected from the group of animal materials consisting of meat and bone meal, blood meal, blood, lymph, chyle, milk whey, egg albumin and mixtures thereof.

4. The method of claim 2 wherein the proteinaceous material is selected from the group of vegetable materials consisting of soymeal, sunflower meal, safflower meal and mixtures thereof.

5. The method of claim 1 wherein the proteinaceous material is aqueous blood containing from about 12% to about 21% blood solids.

6. The method of claim 5 wherein the pH of the aqueous blood is adjusted to a level ranging from about 10.7 to about 13.5.

7. The method of claim 1 wherein the proteinaceous material is delactosed dry whey powder.

8. The method of claim 7 wherein the pH-adjusted aqueous solution of delactosed whey is heated to a temperature ranging from about 55 to about 85 degrees C. to promote gelling of the solution prior to drying.

9. The method of claim 1 wherein the proteinaceous material comprises from about 30 weight percent to about 95 weight percent protein.

10. The method of claim 1 wherein the solubilized proteinaceous matter is adjusted to a pH level ranging from about 9 to about 13.5 by the addition of an alkaline agent selected from nontoxic alkali and alkaline earth metal hydroxides.

11. The method of claim 10 wherein the alkaline agent is sodium hydroxide.

12. The method of claim 1 wherein the pH-adjusted solubilized proteinaceous material is dried to a moisture content of less than about 20 weight percent.

13. The method of claim 1 including the additional step of maintaining the pH-adjusted solubilized proteinaceous material for a period effective to thicken it priot to drying.

14. The method of claim 13 wherein the period effective to thicken the pH-adjusted solubilized proteinaceous material is about 12 hours.

15. The method of claim 1 further comprising heating the pH adjusted solubilized protein material to a temperature in the range of from about 55° to about 85° C. to effect gelling thereof prior to said drying.

* * * * *

UNITED STATES PATENT AND TRADEMARK OFFICE
CERTIFICATE OF CORRECTION

PATENT NO. : 4,225,620

DATED : September 30, 1980

INVENTOR(S) : Robert M. Rawlings, et al.

It is certified that error appears in the above-identified patent and that said Letters Patent are hereby corrected as shown below:

Col. 1, line 31, change "OR" to --OF--;
       line 59, change "supra" to --supra--.
Col. 3, line 46, change "ruman" to --rumen--.
Col. 8, line 34, change "cooled" to --added--.
Col. 11, line 43, change "The" to --This--.
Col. 13, line 48, change "means" to --meals--.
Col. 16, line 56, change "priot" to --prior--.

Signed and Sealed this

Twenty-seventh Day of January 1981

[SEAL]

Attest:

RENE D. TEGTMEYER

Attesting Officer     Acting Commissioner of Patents and Trademarks